(12) United States Patent
Paolini, Jr. et al.

(10) Patent No.: US 8,098,418 B2
(45) Date of Patent: Jan. 17, 2012

(54) ELECTRO-OPTIC DISPLAYS, AND COLOR FILTERS FOR USE THEREIN

(75) Inventors: Richard J. Paolini, Jr., Framingham, MA (US); Steven Joseph Battista, Dorchester, MA (US); Jonathan D. Albert, Philadelphia, PA (US)

(73) Assignee: E. Ink Corporation, Cambridge, MA (US)

( * ) Notice: Subject to any disclaimer, the term of this patent is extended or adjusted under 35 U.S.C. 154(b) by 0 days.

(21) Appl. No.: 12/396,575

(22) Filed: Mar. 3, 2009

(65) Prior Publication Data
US 2010/0225995 A1    Sep. 9, 2010

(51) Int. Cl.
*G02B 26/00* (2006.01)
*G03G 13/00* (2006.01)
*G09G 3/19* (2006.01)

(52) U.S. Cl. ............. 359/296; 430/31; 345/49

(58) Field of Classification Search .......... 359/296, 359/265–277, 245–247, 254, 242; 430/31–32; 345/107, 49, 105; 349/33; 250/70; 438/929
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,371,619 A * | 12/1994 | Sirkin et al. ............. 349/122 |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |

(Continued)

FOREIGN PATENT DOCUMENTS

EP    1 099 207 B1    3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Dawayne Pinkney
(74) *Attorney, Agent, or Firm* — David J. Cole

(57) ABSTRACT

A process for producing a color electro-optic display uses an electro-optic sub-assembly comprising an electro-optic layer and a light-transmissive electrically-conductive layer. This sub-assembly is laminated to a backplane comprising a plurality of electrodes with the electro-optic layer disposed between the backplane and the electrically-conductive layer. A flowable material is placed over the sub-assembly and a color filter array is placed over the electrically-conductive layer and aligned with the electrodes of the backplane to form the color electro-optic display.

9 Claims, 4 Drawing Sheets

U.S. PATENT DOCUMENTS

| | | |
|---|---|---|
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Pratt et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,177,067 B1 | 2/2007 | Sakamoto |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |

| | | |
|---|---|---|
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,667,684 B2 | 2/2010 | Jacobson et al. |
| 7,667,886 B2 | 2/2010 | Danner et al. |
| 7,672,040 B2 | 3/2010 | Sohn et al. |
| 7,679,599 B2 | 3/2010 | Kawai |
| 7,679,814 B2 | 3/2010 | Paolini et al. |
| 7,688,297 B2 | 3/2010 | Zehner et al. |
| 7,688,497 B2 | 3/2010 | Danner et al. |
| 7,705,824 B2 | 4/2010 | Baucom et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,733,554 B2 * | 6/2010 | Danner et al. ............... 359/245 |
| 7,746,544 B2 | 6/2010 | Comiskey et al. |
| 7,785,988 B2 | 8/2010 | Amundson et al. |
| 7,787,169 B2 | 8/2010 | Abramson et al. |
| 7,791,782 B2 | 9/2010 | Paolini et al. |
| 7,791,789 B2 | 9/2010 | Albert et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,848,006 B2 | 12/2010 | Wilcox et al. |
| 7,848,007 B2 | 12/2010 | Paolini, Jr. et al. |
| 7,859,637 B2 | 12/2010 | Amundson et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0263947 A1 | 12/2004 | Drzaic et al. |
| 2005/0012980 A1 | 1/2005 | Wilcox et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0152474 A1 * | 7/2006 | Saito et al. ............... 345/107 |
| 2006/0181504 A1 | 8/2006 | Kawai |
| 2006/0194619 A1 | 8/2006 | Wilcox et al. |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 * | 12/2006 | Patry et al. ............... 359/296 |
| 2007/0013683 A1 | 1/2007 | Zhou et al. |
| 2007/0052757 A1 | 3/2007 | Jacobson |
| 2007/0057908 A1 | 3/2007 | Jacobson |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0200874 A1 | 8/2007 | Amundson et al. |
| 2007/0211002 A1 | 9/2007 | Zehner et al. |
| 2007/0223079 A1 | 9/2007 | Honeyman et al. |
| 2007/0285385 A1 | 12/2007 | Albert et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0150888 A1 | 6/2008 | Albert et al. |
| 2008/0165122 A1 | 7/2008 | Duthaler et al. |
| 2008/0211764 A1 | 9/2008 | Albert et al. |
| 2008/0211765 A1 | 9/2008 | Comiskey et al. |
| 2008/0218839 A1 | 9/2008 | Paolini, Jr. et al. |
| 2008/0266245 A1 | 10/2008 | Wilcox et al. |
| 2008/0273132 A1 | 11/2008 | Hsu et al. |
| 2008/0291129 A1 | 11/2008 | Harris et al. |
| 2008/0309350 A1 | 12/2008 | Danner et al. |
| 2009/0000729 A1 | 1/2009 | Danner et al. |
| 2009/0004442 A1 | 1/2009 | Danner |
| 2009/0009852 A1 | 1/2009 | Honeyman et al. |
| 2009/0034057 A1 | 2/2009 | LeCain et al. |
| 2009/0046082 A1 | 2/2009 | Jacobson et al. |
| 2009/0122389 A1 | 5/2009 | Whitesides et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC DISPLAYS, AND COLOR FILTERS FOR USE THEREIN

REFERENCE TO RELATED APPLICATIONS

This application is related to:
(a) Application Serial No. 10/817,464, filed Apr. 2, 2004 (Publication No. 2004/0190114, now U.S. Patent No. 7,667,684), which is a continuation of abandoned Application Serial No. 09/349,806, filed Jul. 8, 1999 and claiming benefit of Application Serial No. 60/092,050, filed Jul. 8, 1998;
(b) U.S. Patent No. 6,864,875; and
(c) U.S. Patent No. 7,075,502.

The entire contents of this copending application and these patents, and of all other U.S. patents and published and copending applications mentioned below, are herein incorporated by reference.

BACKGROUND OF INVENTION

This invention relates to electro-optic displays and color filters for use in such displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777, 782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870, 657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. No. 7,002,728; and U.S. Patent Application Publication No. 2007/0146310;

(b) Capsules, binders and encapsulation processes; see for example U.S. Pat. Nos. 6,922,276; and 7,411,719;

(c) Films and sub-assemblies containing electro-optic materials; see for example U.S. Pat. No. 6,982,178; and U.S. Patent Application Publication No. 2007/0109219;

(d) Backplanes, adhesive layers and other auxiliary layers and methods used in displays; see for example U.S. Pat. No. 7,116,318; and U.S. Patent Application Publication No. 2007/0035808;

(e) Color formation and color adjustment; see for example U.S. Pat. Nos. 6,017,584; 6,664,944; 6,864,875; 7,075,502; and 7,167,155; and U.S. Patent Applications Publication Nos. 2004/0190114; 2004/0263947; 2007/0109219; 2007/0223079; 2008/0023332; 2008/0043318; and 2008/0048970;

(f) Methods for driving displays; see for example U.S. Pat. No. 7,012,600; and U.S. Patent Application Publication No. 2006/0262060;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Pat. No. 7,339,715); and other similar techniques.) Thus, the resulting display can be flexible. Further, because the display medium can be printed (using a variety of methods), the display itself can be made inexpensively.

Other types of electro-optic media may also be useful in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Patent Application Publication No. 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. As already indicated, the two extreme optical states need not be black and white. For example, one extreme optical state can be white and the other dark blue, so that the intermediate gray levels will be varying shades of blue, or one extreme optical state can be red and the other blue, so that the intermediate gray levels will be varying shades of purple.

There is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another. Using a color filter array enable a single black/white electro-optic medium to provide a full color display (thereby avoiding the need to develop three different electro-optic media displaying the colors needed in a full color display), and it is typically easier to control the color gamut of a display by varying the colors in a color filter array than by varying the colors of electro-optic media, there being far more materials available for use in color filter arrays than in most electro-optic media.

However, attaching a color filter to an electro-optic display in the correction position is a difficult operation. Many color filter arrays are formed on sheets of glass or similar rigid material in order that the color filter will maintain stable dimensions (even slight distortions of the dimensions of a color filter array can lead to at least part of the color filter array being misaligned with the pixels of the display, with consequent errors in the colors displayed to an observer). For similar reasons, most backplanes used in color electro-optic displays are formed of rigid materials. The electro-optic medium is secured to one of the rigid sheets, and then the two rigid sheets are laminated together, typically with a layer of a polyurethane or other lamination adhesive between them, to form the final display. The lamination adhesive layer may have a thickness of about 25 μm. The lamination adhesive is tacky at room temperature , which makes is extremely difficult to laminate the two rigid sheets together without trapping pockets of air between them, especially if the sheets are of substantial size. Despite the use of special alignment tools to keep the rigid sheet flat, and application of substantial pressure, of the order of 100 psig (about 0.8 MPa) at room temperature, it has been found that in practice it is difficult to avoid trapping significant numbers of air bubbles. The air bubbles can be reduced in number or eliminated by passing the laminated display between rolls under conditions of substantial temperature and pressure, or by autoclaving the displays, again under conditions of substantial temperature and pressure. Such expedients for bubble removal substantially increase the cost and duration of the display assembly process, rendering it very time and labor intensive, and do not consistently result in high quality color displays. Furthermore, it appears that this process for lamination of rigid, typically glass, sheets will not allow for a good manufacturing process, because it imposes a large additional set of electrical and rheological constraints that make the lamination very difficult.

Accordingly, there is a need for a process for the lamination of color filter arrays to backplanes to form electro-optic displays which eliminates, or at least reduces, the aforementioned problems, and the present invention seeks to provide such a process.

SUMMARY OF THE INVENTION

This invention provides a process for assembling an electro-optic display which decouples lamination of the electro-optic layer to the backplane from the lamination and alignment of the color filter array to the backplane Accordingly, in one aspect this invention provides a process for producing a color electro-optic display, the process comprising:
  providing an electro-optic sub-assembly comprising an electro-optic layer and a light-transmissive electrically-conductive layer;
  laminating the electro-optic sub-assembly to a backplane comprising a plurality of electrodes such that the electro-optic layer is disposed between the backplane and the electrically-conductive layer;
  disposing a flowable material over the electrically-conductive layer; and
  disposing a color filter array over the electrically-conductive layer and aligning the color filter array with the electrodes of the backplane to form the color electro-optic display.

In this process, typically an adhesive layer will be provided between the electro-optic layer and the backplane. However, provided sufficient adhesion of the electro-optic layer to the backplane can be achieved, it is not always necessary to provide such a discrete electro-optic layer; for example, it is known from U.S. Pat. No. 7,110,164 that in some cases a polymeric binder component within an electro-optic layer can serve as an adhesive, thus eliminating the need for a discrete adhesive layer.

In one form of this process, the electro-optic sub-assembly has the form of a front plane laminate comprising the electrically-conductive layer, the electro-optic layer and an adhesive layer disposed on the opposed side of the electro-optic layer from the electrically-conductive layer, and the lamination is effected by contacting the adhesive layer with the backplane. The front plane laminate may further comprise a release sheet covering the surface of the adhesive layer remote from the electro-optic layer, and this release sheet is removed before the lamination of the front plane laminate to the backplane. As discussed in the aforementioned U.S. Pat. No. 6,982,178, the release sheet may comprise an electrically-conductive layer to permit testing of the electro-optic properties of the front plane laminate; such an electrically-conductive layer is conveniently provided by using a metalized polymeric film as the release sheet. In another form of the process of the present invention, the electro-optic sub-assembly has the form of an inverted front plane laminate comprising, in this order, the electrically-conductive layer, a first adhesive layer, the electro-optic layer, and a second adhesive layer, and the lamination is effected by contacting the second adhesive layer with the backplane. The inverted front plane laminate may further comprise a release sheet covering the surface of the second adhesive layer remote from the electro-optic layer, and this release sheet is removed before the lamination of the inverted front plane laminate to the backplane.

A further variant of this process uses a so-called "double release film" as described in U.S. Patent Application Publication No. 2004/0155857. This double release film is essentially a simplified version of the front plane laminate of the aforementioned U.S. Pat. No. 6,982,178. One form of the double release sheet comprises a layer of a solid electro-optic medium sandwiched between two adhesive layers, one or both (typically both) of the adhesive layers being covered by a release sheet. To use such a double release film in the present process, one of the release sheets is removed from the double release film and the remaining layers are laminated to the backplane with the exposed adhesive layer in contact with the backplane. The second release sheet is then removed and in a second lamination an electrically-conductive layer is laminated to backplane/electro-optic layer sub-assembly produced in the first lamination. Alternatively, but generally less desirably, the laminations could be performed in the reverse order, with the first lamination securing the electro-optic layer to the electrically-conductive layer to form an inverted front plane laminate, and the second lamination securing this inverted FPL to the backplane, as described above. Both variants of the process using a double release film allow the electrically-conductive layer and the electro-optic layer to be chosen independently of one another, and this can be very useful from a manufacturing standpoint; a manufacturer may have various customers requiring differing types of electrically-conductive layer but the same electro-optic layer, and to meet customer demands may manufacture a double release film in bulk using the common electro-optic layer, and then laminate the double release film to the chosen electrically-conductive layer when a particular order is received from a customer.

Also, in the process of the present invention, the electro-optic sub-assembly may further comprise a front substrate disposed on the opposed side of the electrically-conductive layer from the electro-optic layer, the front substrate providing mechanical support and protection to the electrically-conductive layer. In some cases the presence of such a front substrate is necessary because the electrically-conductive layer is not self-supporting; for example, when the electrically-conductive layer is formed of sputtered ITO, the ITO is typically of the order of 1 μm thick and is not self-supporting. This front substrate may have a thickness not greater than about 50 μm, and desirably not greater than about 25 μm; the front substrate remains in the final display and if it is too thick, it may give rise to parallax problems between the color filter array of the electro-optic layer. Whether or not a front substrate is present, the electro-optic sub-assembly may comprise a masking film; such a masking film can serve to substantially increase the thickness of the sub-assembly, thus facilitating handling of the sub-assembly, and may also serve to prevent mechanical damage to the electrically-conductive layer and/or front substrate (if present). The masking film is removed before lamination of the color filter array. The masking film may have a thickness of about 100-200 μm, although thicker films can be used if desired, for example to protect integrated circuits present on the backplane.

The present process allows a variety of flowable materials to be used, as well as a variety of methods of introducing the flowable material between the electrically-conductive layer and the color filter array. In one variant of the present process, the dispositions of the flowable material and the color filter array over the electrically-conductive layer are effected by disposing a plurality of spacers on the exposed surface of the electro-optic sub-assembly laminated to the backplane, disposing the color filter array on the plurality of spacers, introducing a curable polymer between the exposed surface and the color filter array, and curing the curable polymer. Such a process may further comprise disposing a curable edge seal polymer around the periphery of the electro-optic layer but leaving a plurality of gaps in the edge seal polymer, curing the edge seal polymer to form an edge seal having a plurality of apertures extending there through, applying a vacuum to at least one of the apertures while connecting at least one other aperture to a supply of the curable polymer, thereby drawing the curable polymer between the electrically-conductive layer and the color filter array.

In another variant of the present process, the flowable material is a curable polymer dispensed on to the electrically-conductive layer, and after the color filter array has been disposed over the curable polymer and aligned, the curable polymer is cured to secure the color filter array to the electrically-conductive layer. In this variant of the process, the curing of the polymer may advantageously be effected in two stages; after the color filter array has been disposed over the curable polymer and aligned, a plurality of discrete portions of the curable polymer are cured, the curable polymer is treated to remove air bubbles there from, and the remaining portions of the uncured polymer are cured to produce the final display.

In yet another variant of the present process, the flowable material is an adhesive layer which is non-tacky at room temperature (about 21° C.). Alternatively, the flowable material may be a non-curable material which remains unchanged in the final display, for example a grease, desirably a silicone grease. When such a non-curable material is used, the process may further comprise, after alignment of the color filter array, dispensing a curable polymer around the periphery of the electro-optic layer and color filter array, and curing this polymer to form an edge seal which secures the electro-optic layer and color filter array to each other.

In any process of the present invention which requires removal of gas bubbles from the flowable material, by autoclaving or any other process, it is necessary to ensure that the color filter array does not move relative to the backplane during the bubble removal process. While mechanical clamping devices could be used to secure the color filter array, in practice it is more convenient to spot cure either the flowable material itself or, if a non-curable flowable material is employed, to spot cure a curable edge seal material to fix the color filter array in position relative to the backplane.

The electro-optic layer used in the present process may be of any of the types discussed above. Thus, for example, the electro-optic layer may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

This invention also provides an electro-optic display comprising, in this order:
 a backplane comprising a plurality of electrodes;
 an electro-optic layer;
 a light-transmissive electrically-conductive layer;
 a layer of a non-curable, flowable material; and
 a color filter array.

In such a display, the flowable material may be a grease, for example a silicone grease.

DETAILED DESCRIPTION

Figure 1:
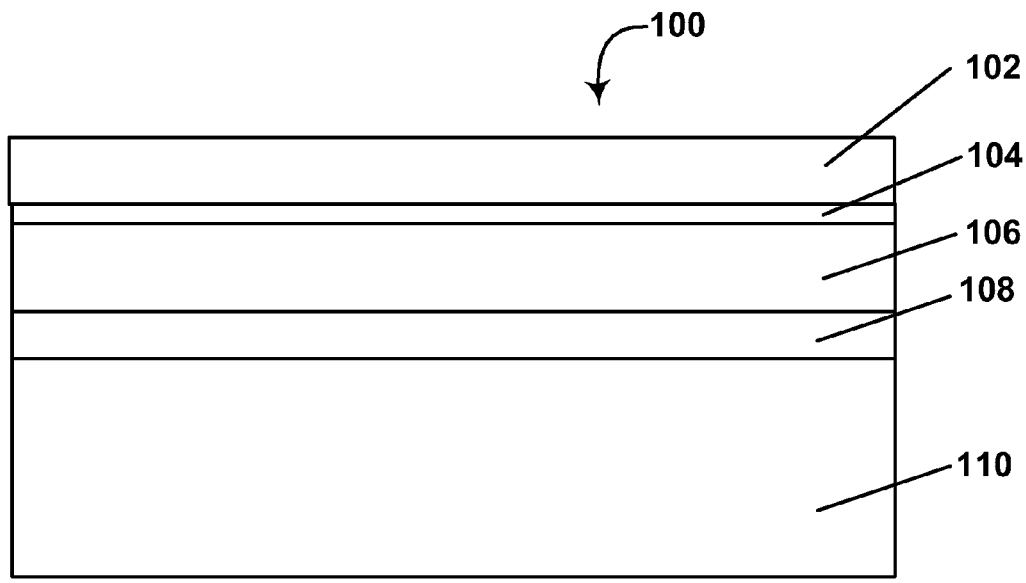
FIG. 1 of the accompanying drawings is a schematic cross-section through a front plane laminate useful in the process of the present invention.

As already mentioned, the present invention provides a process for forming an electro-optic display in which a electro-optic layer and an electrically-conductive layer (typically in the form of a front plane laminate) are first laminated to a backplane. Thereafter, a flowable material is deposited over the electrically-conductive layer, and a color filter array (CFA) is placed over the electrically-conductive, these two steps being performed in either order. In some forms of the present process, the flowable material is cured after the CFA is in place; in others, a non-curable material is employed so that the material remains unchanged in the final display.

In the present process, the electro-optic layer is desirably provided in the form of a front plant laminate. This FPL may be a "classic" FPL as described in U.S. Pat. No. 6,982,178 or an inverted FPL as described in U.S. Patent Application Publication No. 2007/0109219. In either case, it is desirable to make the substrate of the FPL adjacent the CFA thin, in order to minimize parallax and color errors due to the spacing between the CFA and the electro-optic layer. A typical classic FPL (generally designated 100) suitable for use in the present process is shown schematically in FIG. 1 of the accompanying drawings. The FPL 100 comprises a thin front substrate 102, which is typically a transparent polymeric film formed, for example of poly(ethylene terephthalate) (PET). This front substrate 102 may have a thickness of about 6 to about 50 µm; films having thickness of about 13 µm are available commercially and are very suitable for use in the present process. The use of a thin front substrate is important since the color filter array (described below) is separated from the electro-optic layer by the thickness of the front substrate (and by the thickness of the electrically-conductive layer described below, but the electrically-conductive layer is typically much thinner than the front substrate), and if the thickness of the front substrate is too large, parallax problems may be encountered, with consequent degradation of the quality of the image on the color display. The FPL 100 further comprises a light-transmissive, electrically-conductive layer 104, which may be formed of, for example, indium tin oxide (ITO), carbon nanotubes, or an organic conductor. The exact nature of the conductive layer is not of primary importance so long as it is sufficiently conductive to switch the electro-optic layer; usually a resistivity of less than 104 ohms/square suffices. ITO-coated PET films are available commercially and may be used to form the layer 102 and 104 of the FPL 100.

The next layer of the FPL 100 is the electro-optic layer 106, which in this case is an encapsulated electrophoretic layer comprising capsules in a polymeric binder. As described in the aforementioned U.S. Pat. No. 6,982,178, this electro-optic layer may be coated directly on to the conductive layer 104. A layer of lamination adhesive 108 is disposed on the opposed side of the electrophoretic layer 106 from the substrate 102; suitable adhesives are discussed, for example, in U.S. Pat. Nos. 7,012,735 and 7,477,444. Finally, the FPL 100 comprises a release sheet 110.

Figure 2:
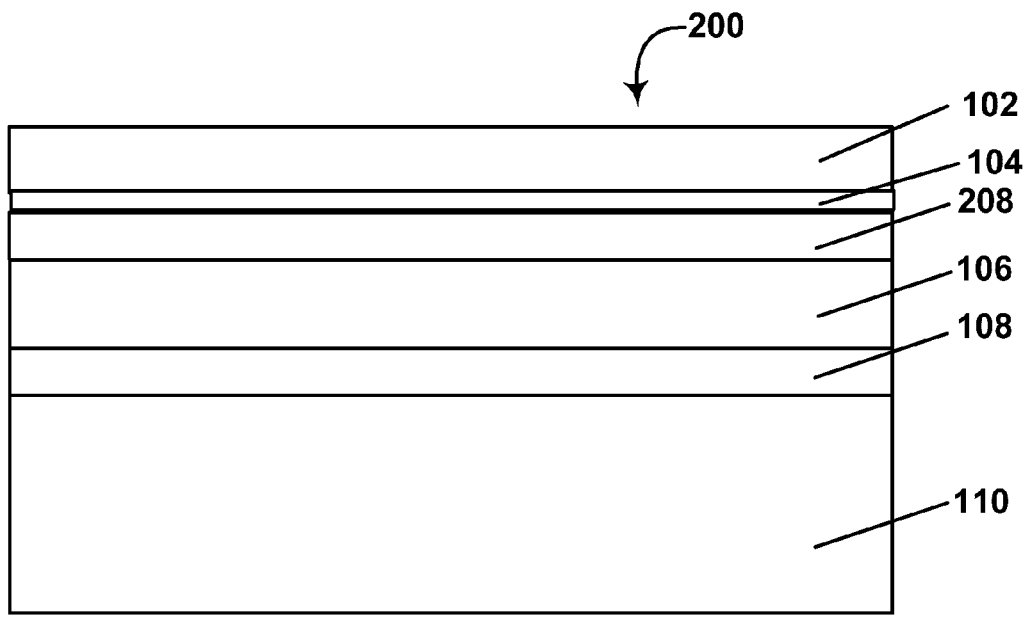
FIG. 2 is a schematic cross-section, similar to that of FIG. 1, through an inverted front plane laminate useful in the process of the present invention.

FIG. 2 illustrates an inverted front plane laminate 200 which can be used in the present process. The inverted FPL 200 differs from the classic FPL 100 shown in FIG. 1 by the inclusion of a second adhesive layer 208 interposed between the conductive layer 104 and the electro-optic layer 106. The reasons for inclusion of this second adhesive layer 208 are discussed in detail in the aforementioned 2007/0109219.

Figure 3:
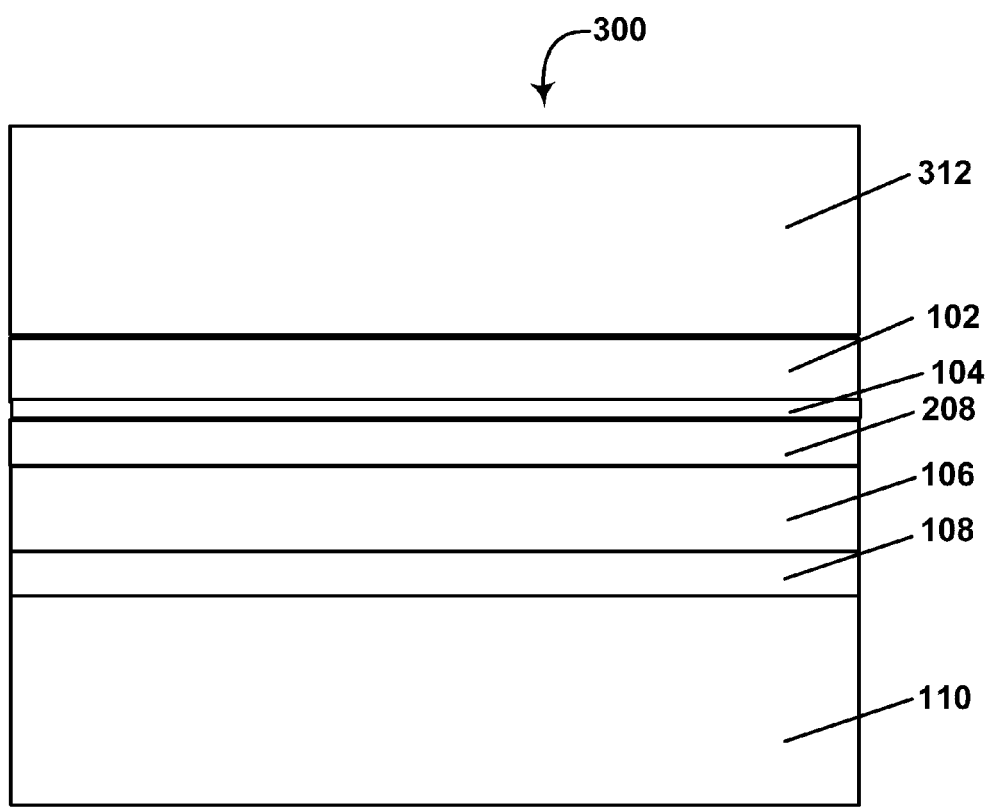
FIG. 3 is a schematic cross-section, similar to those of FIGS. 1 and 2, through a modified form of the inverted front plane laminate of FIG. 2.

FIG. 3 illustrates a second inverted front plane laminate 300 which differs from the inverted FPL 200 shown in FIG. 2 by the addition of a masking film 312 covering the substrate 102. As explained in U.S. Patent Application Publication No. 2008/0174853, a masking film can usefully be included in a thin FPL or similar multi-layer film to facilitate handling of the thin film and/or to provide mechanical protection to a substrate during manufacturing or display assembly operations.

The FPL 100 shown in FIG. 1 can also be modified by the addition of a masking film similar to that shown in FIG. 3.

As already mentioned, the first step in the process of the present invention is lamination of an FPL to a backplane; this backplane may be of the direct drive type (in which each electrode is provided with a separate conductor so that the voltage on each electrode can be controlled independently) or of an active matrix type (in which pixel electrodes are arranged in a two-dimensional matrix of rows and columns, with a non-linear device, typically a thin film transistor, associated with each pixel, and with all of the electrodes in each row being connected to a row electrode and all of the electrodes in each column being connected to a column electrode). Some forms of electro-optic medium may also permit the use of a passive matrix backplane.

Figure 4:
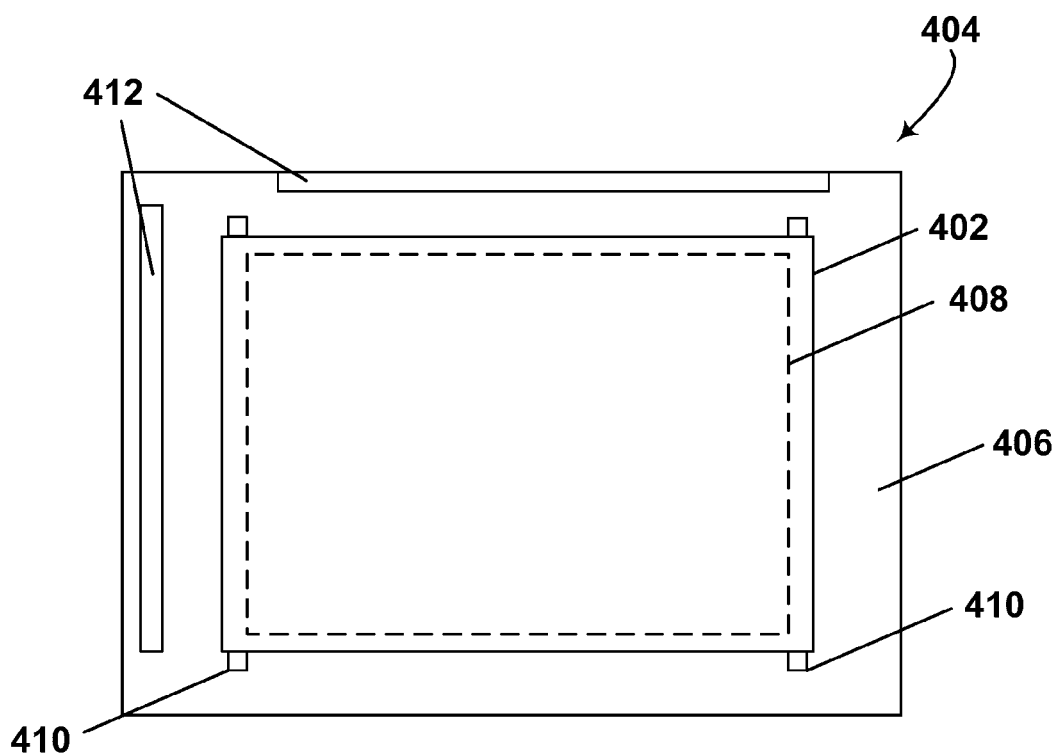
FIG. 4 is a top plan view of an electro-optic display being assembled by a process of the present invention, the top plan view being taken at an intermediate point in the process after lamination of a front plane laminate to the backplane but before lamination of a color filter array.

FIG. 4 is a top plan view of a preferred process of the present invention after lamination of an FPL 402 (which may be of any of the types described above) to a backplane (generally designated 404). As shown in FIG. 4, the backplane 404 comprises a substrate 406, the central part of which is occupied by an active matrix backplane 408; the FPL 402 is laminated on to this active matrix backplane 408 so that a small peripheral portion of the FPL 402 extends beyond the edges of the backplane 408. Alignment marks 410 are provided on the substrate 406 adjacent the area occupied by the FPL 402. Chip bonding areas 412 are also provided on the substrate 406 at points spaced from the backplane 408.

The lamination of the FPL 402 to the backplane 408 may be effected by any of the methods described in the aforementioned E Ink patents and applications. Basically, the release sheet 110 (see FIGS. 1-3) is peeled from the FPL, and the FPL is laminated to the backplane, typically at elevated temperature and pressure. Once the FPL has been so laminated to produce an intermediate structure as shown in FIG. 4, a color filter array is attached using the first process of the present invention.

As already mentioned, this process requires introduction of a flowable liquid material between the FPL and a color filter array. Within the scope of the present invention, various methods may be used to introduce the flowable liquid material. One method is similar to that used to assembly liquid crystal displays. A mixture of spacers (typically spheres of closely controlled diameter) and a curable polymer is dispensed around the periphery of the FPL to form a peripheral seal, but multiple gaps are left in this seal. The CFA is then placed on to the mixture of spacers and polymer. Typically, accurate location of the CFA relative to the backplane is effected by aligning alignment marks on the CFA with similar marks on the backplane; the uncured polymer permits movement of the CFA relative to the backplane. The polymer is then cured to fix the CFA relative to the backplane. One or more of the apertures in the peripheral seal produced by the aforementioned gaps is connected to a vacuum, while the other apertures are connected to a supply of low viscosity curable polymer, which is drawn by the vacuum between the FPL and the CFA. Finally, the low viscosity curable polymer is cured to form the final display. In some cases, it may be advantageous to lay down a narrow perimeter of a (typically) different curable polymer around the periphery of the FPL after the FPL has been laminated to the backplane, this different curable polymer being chosen to avoid switching performance issues at the edges of the display. The narrow perimeter of polymer also seals the FPL, thus preventing loss of moisture and/or entry of environmental contaminants when the FPL is exposed to vacuum during the filling process. A similar peripheral seal of the FPL can be used in other variants of the present process described below.

In one such variant of the present process, a curable polymer is dispensed on top of the FPL after the FPL has been laminated to the backplane. The pattern in which the curable polymer is dispensed should be chosen to minimize trapping of air between the FPL and the CFA to be placed over the FPL; for example, this pattern could take the form of a single puddle in the center of the FPL, a pattern of lines radiating from the center of the FPL, or a "X" shape. The CFA is then brought down on to the curable polymer and pressed lightly downwards to cause the curable polymer to spread and set the entire area of the facing FPL and CFA surfaces. The volume of curable polymer placed on the FPL should be carefully controlled so that the entire area of the facing FPL and CFA surfaces is covered, but there is no excessive leaking of curable polymer past the edges of the CFA. At this point, the CFA can be aligned using alignment marks such as those shown in FIG. 4, and a number of small areas of the curable polymer adjacent the periphery of the FPL are cured to lock the CFA in place relative to the backplane. Any gas bubbles remaining in the polymer can then be removed by autoclaving or any other known technique. After elimination of the gas bubbles, the remaining areas of uncured polymer are cured to produce the final display.

In another variant of the present process, a "solid", non-tacky adhesive is used to adhere the CFA to the FPL (by "non-tacky" is meant non-tacky at room temperature, or about 21° C. This adhesive may be placed on the FPL or on the CFA, and the adhesive layer may conveniently be coated on to a release sheet and laminated to the FPL or CFA immediately prior to attachment of the other part. It is desirable that a pattern or some form of roughness be formed into the adhesive to allow air to escape during the lamination of the FPL to the CFA. The non-tacky adhesive allows for relative movement between the FPL and the CFA sufficient for alignment of the two integers prior to lamination of the two using any one or more of elevated temperature, pressure and vacuum. In some cases, the laminated CFA/FPL combination may be reheated after lamination sufficiently to enable final alignment of the two parts to be effected.

In another variant of the present process, a pressure sensitive adhesive (PSA) that is tacky at room temperature may be used as the flowable material. The use of such a PSA avoids the need for processing at elevated temperatures with consequent risk of distortion of certain display components but does have the disadvantage of providing only limited movement of the color filter array relative to the backplane once these parts come into contact with each other.

In another variant of the present process, a film of grease is used to couple the FPL to the CFA. Appropriate greases include the silicone greases described in U.S. Pat. Nos. 5,275,680 and 5,371,619. Such greases are chemically inert, have stable properties over a wide temperature range, have a long working life at room temperature and show low void formation during the lamination process. The grease film may be coated directed on to either the FPL or the CFA, or a preformed grease film (for example, coated on a release sheet) may be laminated to one or other of these parts. The parts can then be brought together and aligned accurately. Any air bubbles trapped in the grease can be eliminated by autoclaving, which is especially effective with a grease film because of the viscosity and flowability of the grease. Since the grease remains flowable even in the completed display, it is desirable, as a final step in the assembly of the display, to dispense a curable polymer around the periphery of the FPL and CFA and cure this polymer to form an edge seal which secures the FPL and CFA in the correct positions relative to each other. As already noted, such a curable polymer edge seal may usefully be spot cured to hold the color filter array fixed relative to the backplane during operations for removing bubbles from the grease.

Figure 5:
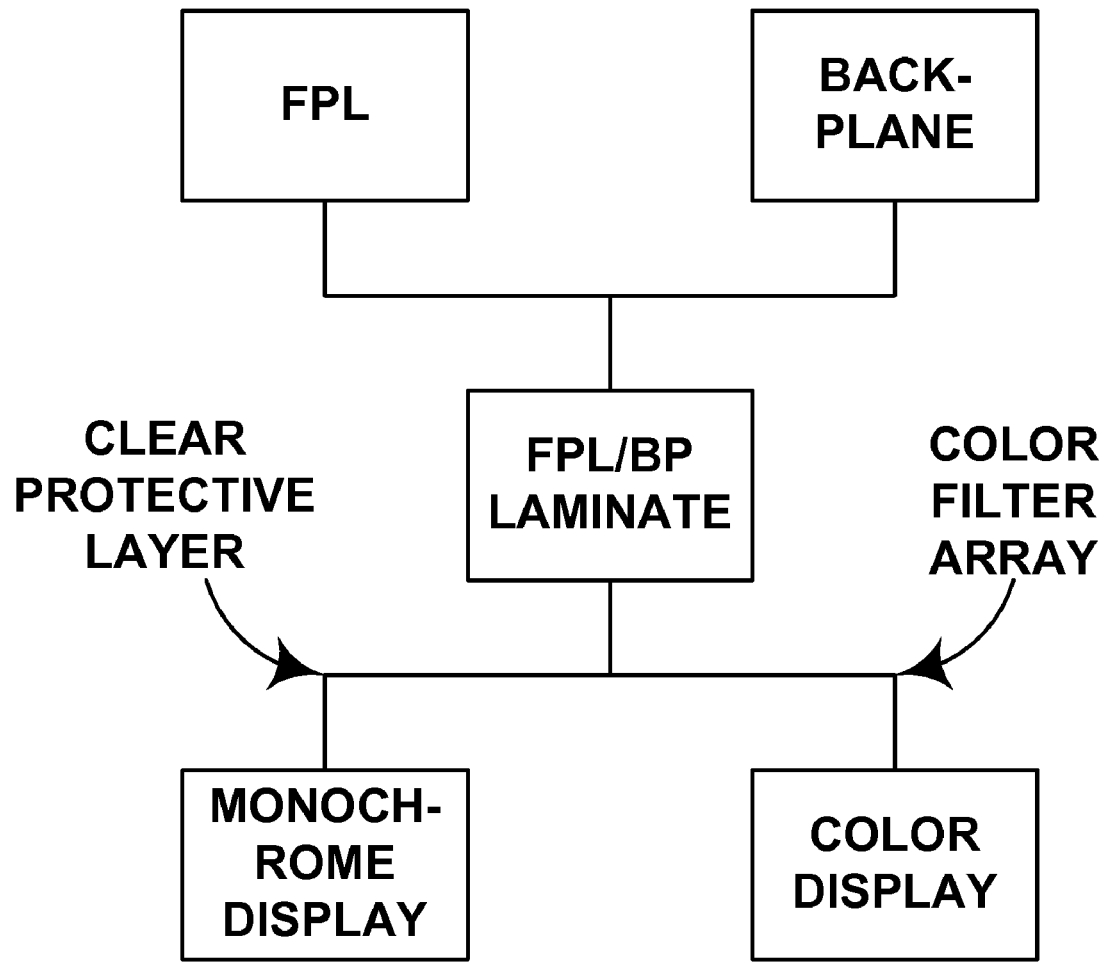
FIG. 5 is a flow diagram showing the manner in which the process of the present invention facilitates the manufacture of monochrome and color electro-optic displays using the same front plane laminate and backplane.

As already mentioned, the present invention decouples the lamination of the electro-optic layer (typically in the form of an FPL) to the backplane from the lamination of the CFA to the electro-optic layer. This has the further advantage of providing a convenient route to manufacture of both monochrome and color displays on a single production line, as illustrated in FIG. 5. As shown in that Figure, such a production line may be operated to take a supply of FPL 502 and a supplies of backplanes 504, and laminate them together (as represented at 506) to produce backplane/FPL laminates. These laminates can then be laminated to CFA to form color displays, as represented at 508, or a protective layer can be laminated over the FPL to form monochrome displays, as indicated at 510.

In summary, the present invention provides an improved white state of a color display with only minor impact on the saturation of basic colors, provides balanced rendering of color and better apparent saturation, and can provide energy savings when front or back lighting is used.

Numerous changes and modifications can be made in the preferred embodiments of the present invention already described without departing from the scope of the invention. Accordingly, the foregoing description is to be construed in an illustrative and not in a limitative sense.

The invention claimed is:

1. A process for producing a color electro-optic display, the process comprising:
   providing an electro-optic sub-assembly comprising an electro-optic layer and a light-transmissive electrically-conductive layer;
   laminating the electro-optic sub-assembly to a backplane comprising a plurality of electrodes such that the electro-optic layer is disposed between the backplane and the electrically-conductive layer;
   disposing a flowable material over the electrically-conductive layer; and
   disposing a color filter array over the electrically-conductive layer and aligning the color filter array with the electrodes of the backplane to form the color electro-optic display,
   wherein the dispositions of the flowable material and the color filter array over the electrically-conductive layer are effected by disposing a plurality of spacers on the electrically-conductive layer, disposing the color filter array on the plurality of spacers, introducing a curable polymer between the electrically-conductive layer and the color filter array, and curing the curable polymer.

2. A process according to claim 1 further comprising disposing a curable edge seal polymer around the periphery of the electro-optic layer but leaving a plurality of gaps in the edge seal polymer, curing the edge seal polymer to form an edge seal having a plurality of apertures extending there-through, applying a vacuum to at least one of the apertures while connecting at least one other aperture to a supply of the curable polymer, thereby drawing the curable polymer between the electrically-conductive layer and the color filter array.

3. A process for producing a color electro-optic display, the process comprising:
   providing an electro-optic sub-assembly comprising an electro-optic layer and a light-transmissive electrically-conductive layer;
   laminating the electro-optic sub-assembly to a backplane comprising a plurality of electrodes such that the electro-optic layer is disposed between the backplane and the electrically-conductive layer;
   disposing a flowable material over the electrically-conductive layer; and
   disposing a color filter array over the electrically-conductive layer and aligning the color filter array with the electrodes of the backplane to form the color electro-optic display,
   wherein the flowable material is a curable polymer dispensed on to the electrically-conductive layer and, after the color filter array has been disposed over the curable polymer and aligned, the curable polymer is cured to secure the color filter array to the electrically-conductive layer.

4. A process according to claim 3 wherein, after the color filter array has been disposed over the curable polymer and aligned, a plurality of discrete portions of the curable polymer are cured, the curable polymer is treated to remove air bubbles therefrom, and the remaining portions of the uncured polymer are cured to produce the final display.

5. A process according to claim 3 wherein the electro-optic layer comprises a rotating bichromal member or electrochromic material.

6. A process according to claim 3 wherein the electro-optic layer comprises an electrophoretic material comprising a plurality of electrically charged particles disposed in a fluid and capable of moving through the fluid under the influence of an electric field.

7. A process according to claim 6 wherein the electrically charged particles and the fluid are confined within a plurality of capsules or microcells.

8. A process according to claim 6 wherein the electrically charged particles and the fluid are present as a plurality of discrete droplets surrounded by a continuous phase comprising a polymeric material.

9. A process according to claim 6 wherein the fluid is gaseous.

* * * * *